United States Patent
Stephenson et al.

(10) Patent No.: US 8,732,103 B2
(45) Date of Patent: *May 20, 2014

(54) PROCESS CONTROLLER HAVING A LABORATORY DATA VALIDATION MODEL AND METHODS FOR USING THE SAME

(71) Applicant: Rockwell Automation Technologies, Inc., Mayfield Heights, OH (US)

(72) Inventors: Brian Kent Stephenson, Georgetown, TX (US); David G. Hoch, Falmouth, ME (US); L. Paul Collete, III, Westminster, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,707

(22) Filed: Jan. 7, 2013

(65) Prior Publication Data

US 2013/0124443 A1    May 16, 2013

Related U.S. Application Data

(63) Continuation of application No. 12/242,670, filed on Sep. 30, 2008, now Pat. No. 8,352,394.

(51) Int. Cl.
*G06F 17/00* (2006.01)
*G06N 5/00* (2006.01)

(52) U.S. Cl.
USPC .......................................................... 706/45

(58) Field of Classification Search
None
See application file for complete search history.

(56) References Cited

U.S. PATENT DOCUMENTS

| | | | |
|---|---|---|---|
| 5,142,612 A * | 8/1992 | Skeirik | 706/23 |
| 5,386,373 A | 1/1995 | Keeler et al. | |
| 6,345,259 B1 * | 2/2002 | Sandoval | 705/7.11 |
| 7,319,040 B2 | 1/2008 | Vaidyanathan et al. | |

* cited by examiner

*Primary Examiner* — Li-Wu Chang
(74) *Attorney, Agent, or Firm* — Fletcher Yoder P.C.; William R. Walbrun; John M. Miller

(57) ABSTRACT

The present invention provides novel techniques for validating laboratory data values for properties of interest of products produced by a process system. In particular, samples of the product may be sent to a laboratory testing facility, where laboratory testing procedures may be used to obtain the laboratory data values for the property of interest. The laboratory data values may be sent to a control system which includes a laboratory data validation module. The laboratory data validation module may be capable of validating the laboratory data values of the property of interest by comparing the laboratory data values of the property of interest with predicted values generated by a model. The model may be created using inputs such as laboratory and measured data values of the property of interest as well as laboratory and measured data values of other properties of the product. In particular, the laboratory data validation module may, in certain embodiments, include a laboratory data validation model, which may aid the validation of the laboratory data values of the property of interest.

20 Claims, 6 Drawing Sheets

PROCESS CONTROLLER HAVING A LABORATORY DATA VALIDATION MODEL AND METHODS FOR USING THE SAME

CROSS-REFERENCE TO RELATED APPLICATION

This application is a Continuation Application of U.S. patent application Ser. No. 12/242,670, entitled "Validation of Laboratory Test Data", filed on Sep. 30, 2008, which is herein incorporated by reference in its entirety.

BACKGROUND

Embodiments of the present invention relate generally to control systems, and more particularly to techniques for validating laboratory test data for to properties of interest of products produced by a process system.

Many manufacturing processes do not allow many of the critical qualities and properties of the product to be measured directly and during production (i.e., directly from the process). Typically, these properties are determined by taking a sample of the product from the process and performing tests, such as destructive tests, in a laboratory environment. Only a certain number of samples from the process may be used for laboratory testing, due at least in part to cost and logistics considerations. As a result, there may only be sporadic laboratory property measurements available for the operator of the process to consider. Therefore, these laboratory property measurements may be critical for the implementation of both manual and automatic process corrections necessary to produce a finished product which meets desired quality specifications. As such, these results should be as reliable, repeatable, and accurate as possible.

BRIEF DESCRIPTION

The present invention provides novel techniques for validating laboratory data values for properties of interest of products produced by a process system. In particular, samples of the product may be sent to a laboratory testing facility, where laboratory testing procedures may be used to obtain the laboratory data values for the property of interest. The laboratory data values may be sent to a control system which includes a laboratory data validation module. The laboratory data validation module may be capable of validating the laboratory data values of the property of interest by comparing the laboratory data values of the property of interest with predicted values generated by a model. The model may be created using inputs such as laboratory and measured data values of the property of interest as well as laboratory and measured data values of other properties of the product. In particular, the laboratory data validation module may, in certain embodiments, include a laboratory data validation model, which may aid the validation of the laboratory data values of the property of interest.

DRAWINGS

These and other features, aspects, and advantages of the present invention will become better understood when the following detailed description is read with reference to the accompanying drawings in which like characters represent like parts throughout the drawings, wherein.

Figure 1:
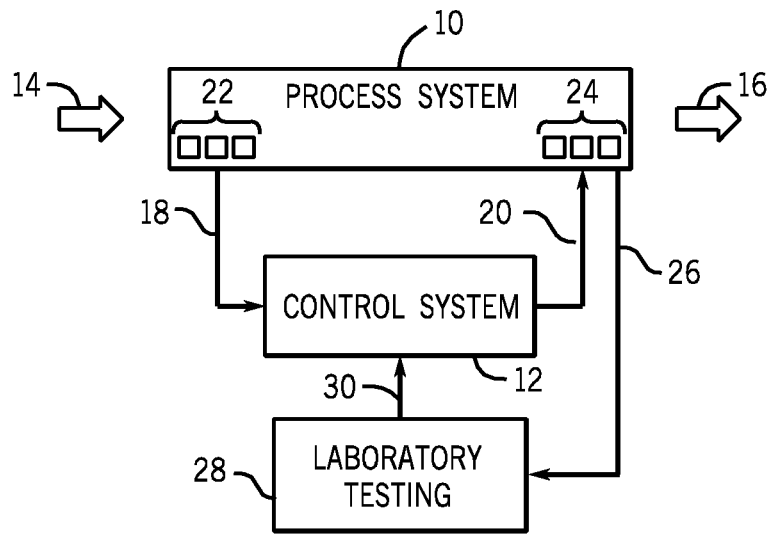
FIG. 1 is a diagram of an exemplary process system equipped with an exemplary control system designed to implement the present laboratory data validation techniques.
Figure 6:
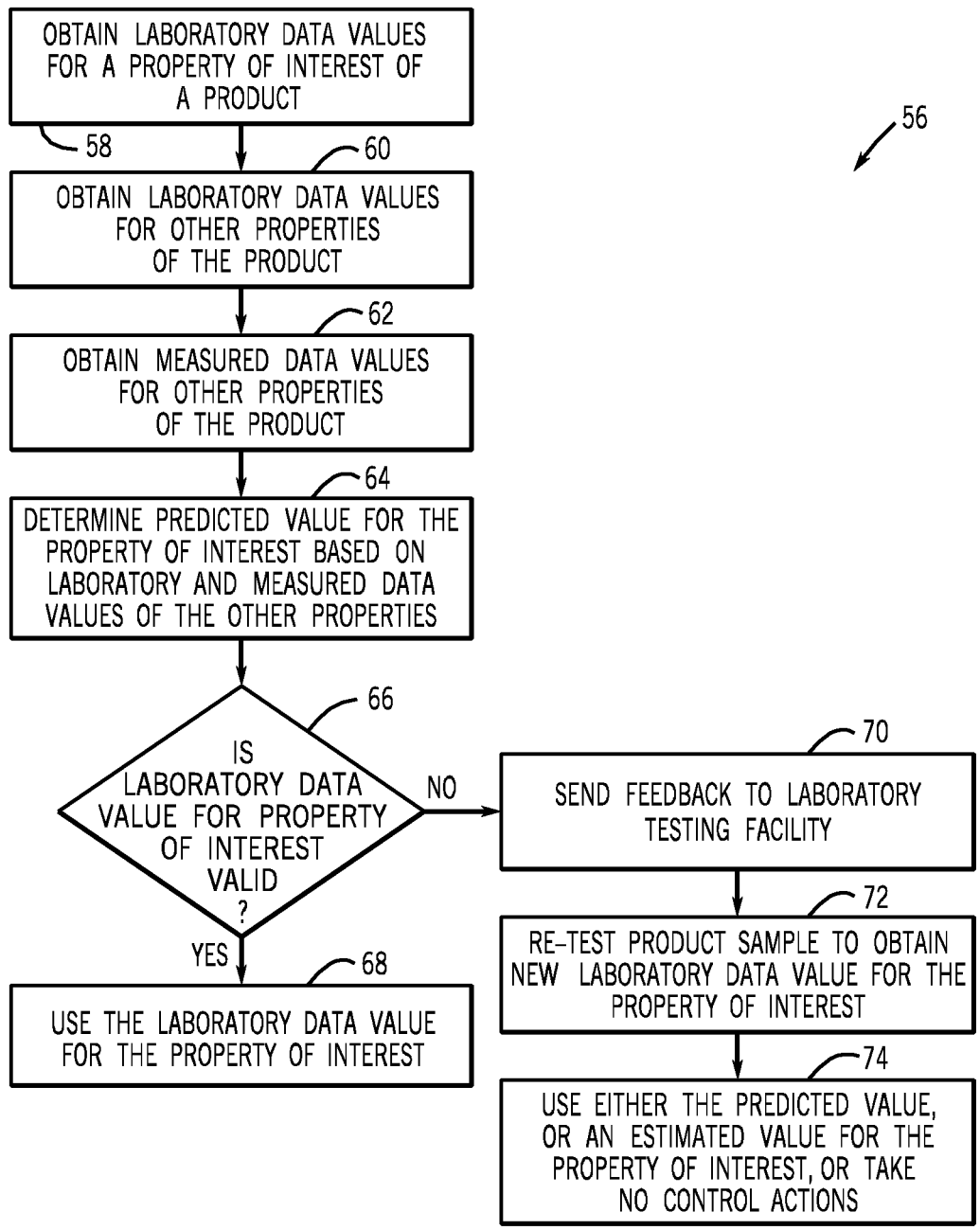
Figure 7:
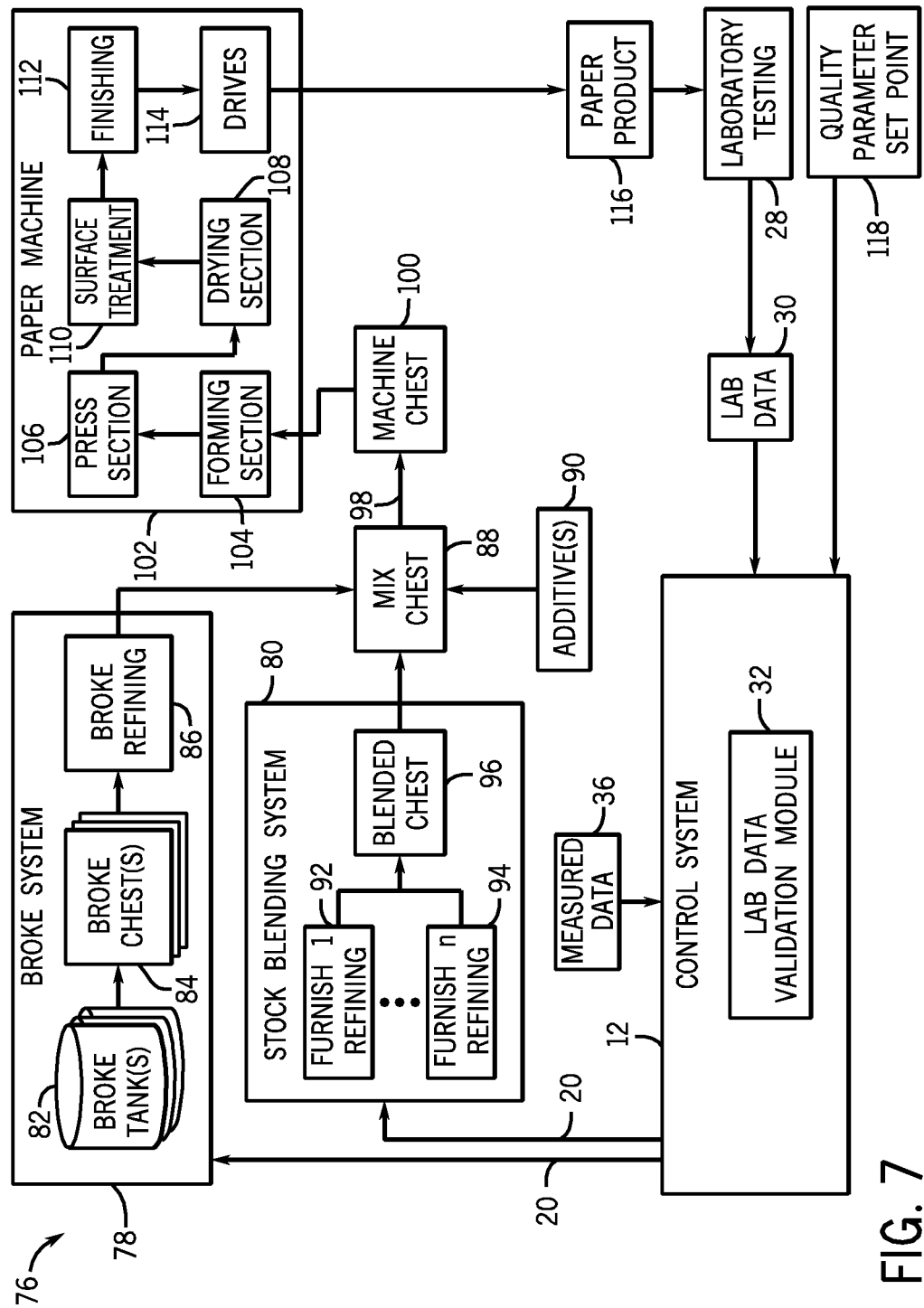

FIG. 6 is a flow chart of an exemplary method for validating laboratory data values against predicted values for a property of interest of a product of the process system of FIG. 1; and FIG. 7 is a diagram of an exemplary paper manufacturing plant equipped with a control system including a laboratory data validation module configured to implement the present laboratory data validation techniques for a property of interest of the paper manufacturing process.

DETAILED DESCRIPTION

Turning now to the drawings, and referring first to FIG. 1, a process system 10 is illustrated that is at least partially regulated by a control system 12. The process system 10 may be any conceivable type of process, such as a manufacturing process, a steady state or batch process, a chemical process, a material handling process, an engine or other energy utilizing process, an energy production process, and so forth. In an exemplary embodiment, as will be described in further detail below with reference to FIG. 7, the process system 10 may be a paper manufacturing process.

In general, the process system 10 may receive one or more inputs 14, and produce one or more outputs 16. By way of example, in complex processes found in the industry, many such inputs may be utilized, including feedstock, raw materials, electrical energy, fuels, parts, assemblies and sub-assemblies, and so forth. Outputs may include finished products, semi-finished products, assemblies, manufacturing products, by products, and so forth. Based upon the system dynamics, the physics of the system and similar factors, the control system 12 may regulate operations of the process system 10 in order to control both the production of the outputs as well as the quality of the outputs, and so forth.

In the embodiment illustrated in FIG. 1, the control system 12 may perform control functions 20 in response to process information 18 received from the process system 10. For instance, process information 18 may be provided by one or more sensors 22 configured to detect and/or measure certain parameters of the process system 10, which may include measurements representative of both manipulated and controlled variables. In general, such sensors 22 may include measurement devices, transducers, and the like, which may produce discrete or analog signals and values representative of various variables of the process system 10. Such sensors 22 commonly produce voltage or current outputs that are representative of the sensed variables. The process information 18 may also include controllable and external operating constraints, as well as operator-specified set points, for example. The sensors 22 may be coupled to one or more controllers of the control system 12.

From the control system 12, control actions or functions 20 may be sent to one or more actuators 24, which may serve to alter portions of the process system 10 to regulate the process output 16. Such actuators 24 may include, by way of example only, valves, motors, position devices, pumps, and so forth. The sensors 22 may provide signals representative of measured values of process variables. These measured values may be analog or digital signals or values and may be measured directly by the sensors 22 or, in certain applications, may be derived from other measured values. Based upon certain measured values, the control system 12 may develop or derive values for certain system parameters based upon a predictive control model, which may define mathematical relationships between the measured values and those desired parameters. Such inference may be particularly useful where control is desired based upon particular system parameters which are impossible or difficult to measure on-line (e.g., directly from the process). For instance, as discussed above, certain process parameters, such as a product quality parameters, which may be related to a product 16 produced by the process system 10, may be determined using off-line testing in a laboratory environment. Thus, the present techniques for model predictive control (MPC) may thus employ virtual on-line sensors (VOAs), which effectively operate as a sensor by differentially determining certain desired variables for control purposes.

While the presently described techniques may provide for the on-line prediction of one or more process parameter values (e.g., using MPC techniques) which are typically only determinable off-line, the use of such off-line measurements may, nevertheless, be further utilized for validation of the predicted parameter value. In the present context, "on-line" means that the values are determined as part of an automated control scheme during production, while "off-line" means that values or measurements are determined outside of the automated control context, such as by laboratory tests of product samples taken from the production process. For instance, the control system 12 may be configured to communicate with and receive data from a laboratory testing facility 28. As discussed above, samples 26 of the products 16 may be provided to the laboratory testing facility 28 for further testing to determine certain product parameters. Thus, the laboratory testing facility 26 may perform one or more tests in order to determine a particular quality parameter of the resulting product 16. By way of example, in a paper manufacturing setting, the laboratory testing facility 28 may perform testing procedures on a paper sample to determine one or more mechanical, structural, optical, or other types of parameters of the paper.

Accordingly, the laboratory measurements of the above-discussed quality parameters, represented by the reference numeral 30, may be provided to the control system 12 for comparison with a corresponding predicted parameter value. If a difference exists between the laboratory data values 30 and the predicted values, then the control system 12 may provide for the biasing or correction of the predicted values provided by a dynamic predictive model, for instance. That is, the control system 12 may adjust the prediction of the quality parameter in accordance with the laboratory data values 30.

Based on the adjusted values, the control system 12 may then determine the appropriate control actions or functions 20 (e.g., manipulation of variables to desired set points) required to achieve or approach a control objective, which may be defined by one or more objective or cost functions associated with the controller. In certain embodiments, the objective or cost functions may be defined as part of a dynamic predictive model. Further, in practice, the desired set points of certain process variables determined by the control system 12 may or may not be communicated to the actuators 24 themselves. That is, the actuators 24 may receive drive signals having the effect of moving certain process parameters towards their desired set points, such as a valve position signal for driving a valve actuator in order to cause a desired flow rate, the flow rate itself being the desired set point for a manipulated variable.

Figure 2:
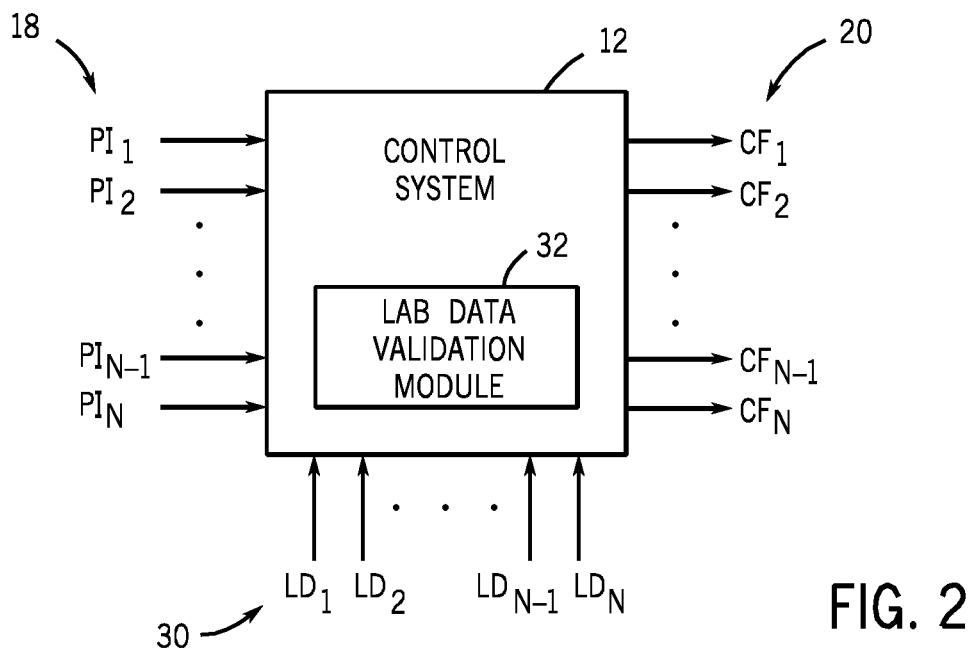
FIG. 2 is a diagram of an exemplary control system configured to implement the present laboratory data validation techniques.

FIG. 2 is a diagram of an exemplary control system 12 configured to implement the present laboratory data validation techniques. The control system 12 may utilize MPC techniques and may include any number of application-specific or general purpose computers programmed to carryout the functions described herein. The control system 12 may receive multiple process information values 18, represented by the reference labels $PI_1$, $PI_2$, ..., $PI_{N-1}$, and $PI_N$. As mentioned above, these process information values 18 may include measured data values from sensors 22 of the process system 10, as shown in FIG. 1. In addition, the control system 12 may receive multiple laboratory data values 30, represented by the reference labels $LD_1$, $LD_2$, ..., $LD_{N-1}$, and $LD_N$. Based on the process information 18 and laboratory data values 30 received, the control system 12 may generate multiple appropriate control actions or functions 20, represented by the reference labels $CF_1$, $CF_2$, ..., $CF_{N-1}$, and $CF_N$. Therefore, the control system 12 may use process information 18, such as measured data values from sensors 22 of the process system 10, as well as laboratory data values 30 to aid in the determination of appropriate control actions or functions 20 which may be implemented by the actuators 24 of the process system 10, as shown in FIG. 1.

The control system 12 may also include a laboratory data validation module 32, which may be used to validate the laboratory data values 30, as discussed in greater detail below. In certain embodiments, the laboratory data validation module 32 may ensure that the laboratory testing procedures are producing accurate laboratory data values 30 for properties of interest of the product 16, such as quality parameters. In particular, the laboratory data validation module 32 may ensure that laboratory data values 30 for properties of interest correlate adequately with predicted values for the properties of interest. The predicted values for the properties of interest may be generated by the laboratory data validation module 32 using, for instance, both measured and laboratory data values for other properties of the produced products 16. The laboratory data validation module 32 may, in certain embodiments, use a predictive model for predicting data values for the properties of interest.

One important consideration in determining how effective the laboratory testing procedures will be for obtaining laboratory data values 30 may be the amount of time required to obtain the laboratory data values 30. Obtaining laboratory data values 30 may inherently take longer than directly measuring data values from sensors 22 of the process system 10. For instance, in order to obtain laboratory data values 30, a sample 26 of the product 16 must first be sent to the laboratory testing facility 28. Once at the laboratory testing facility 28, the laboratory testing procedures must then be performed on the sample 26 to obtain the laboratory data values 30. Finally, the laboratory data values 30 must be sent to the laboratory data validation module 32 of the control system 12. By comparison, obtaining measured data values may require only that the sensors 22 directly measure the data values on-line and send the measured data values to the laboratory data validation module 32 of the control system 12.

Figure 3:
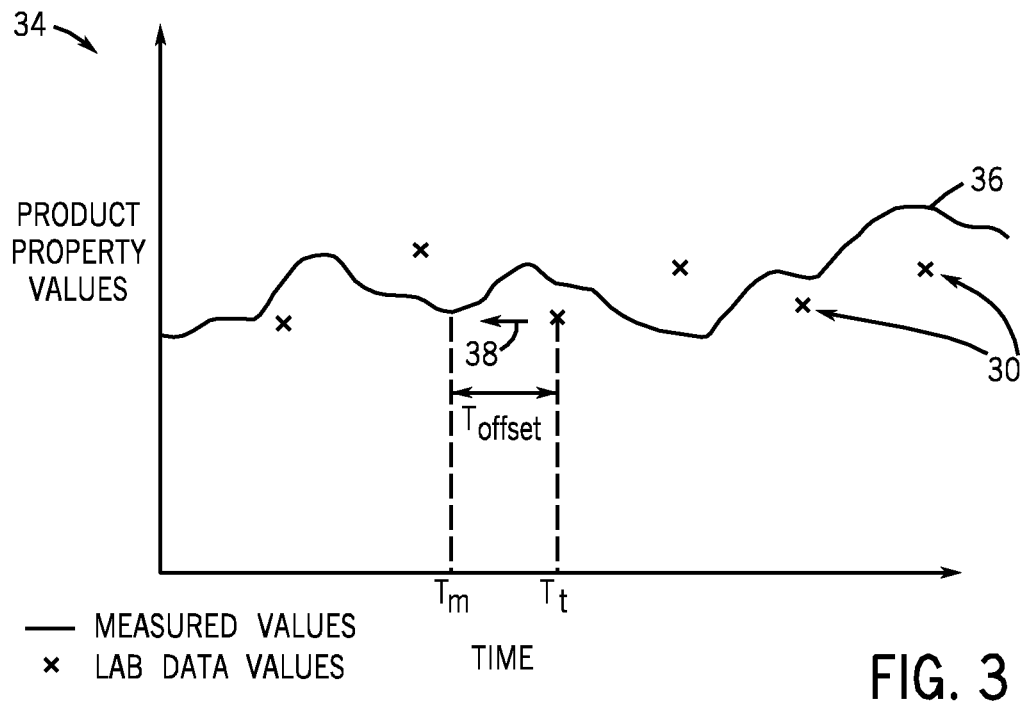
FIG. 3 is a chart of exemplary time series depicting laboratory data values and measured data values for a property of interest of the product of the process system of FIG. 1, the chart illustrating a time lag between the laboratory data values and the measured data values.

As such, a lag may exist between the direct measurement of data values via sensors 22 of the process system 10 and the generation of laboratory data values 30 via the laboratory testing facility 28. For example, FIG. 3 is a chart 34 of exemplary time series depicting laboratory data values 30 and measured data values 36 for a property of interest of the product 16 of the process system 10 of FIG. 1, the chart 34 illustrating a time lag 38 between the laboratory data values 30 and the measured data values 36. As illustrated in FIG. 3, the time series of measured data values 36 may be obtained in real-time in a substantially continuous manner. However, although depicted as a substantially continuous time series, even this direct measurement of data values by the sensors 22 of the process system 10 may occur at a somewhat fixed time interval, instead of substantially continuously. For example, a direct measurement may occur for a particular sample 26 of the product 16, then the next sample 26 of the product 16 may be moved into place, then the next direct measurement may occur, and so forth. However, the time series of measured data values 36 is depicted as substantially continuous in FIG. 3 to contrast the more periodic nature of the time series of laboratory data values 30 relative to the time series of measured data values 36. As discussed above, the laboratory data values 30 may be obtained at a somewhat lower frequency than the measured data values 36 at least in part due to the relatively longer series of steps required by the laboratory testing procedures.

As discussed above, the laboratory data values 30 may take slightly longer to be delivered to the laboratory data validation module 32 than the measured data values 36. Therefore, it may be necessary to adjust one or both of the laboratory and measured data value time series 30, 36 to ensure that the laboratory data values 30 correlate time-wise with the measured data values 36. For instance, data values of the laboratory and measured time series 30, 36 may be correlated by time stamping data values. As such, the time lag 38 between the laboratory and measured data value time series 30, 36 (e.g., the time period between time $T_t$ and $T_m$) may be taken into account. However, other various time synchronization methods may also be implemented to ensure that the data values correspond time-wise. The remaining time series presented herein will be presented assuming that the laboratory and measured data value time series 30, 36 have been appropriately synchronized time-wise.

Figure 4A:
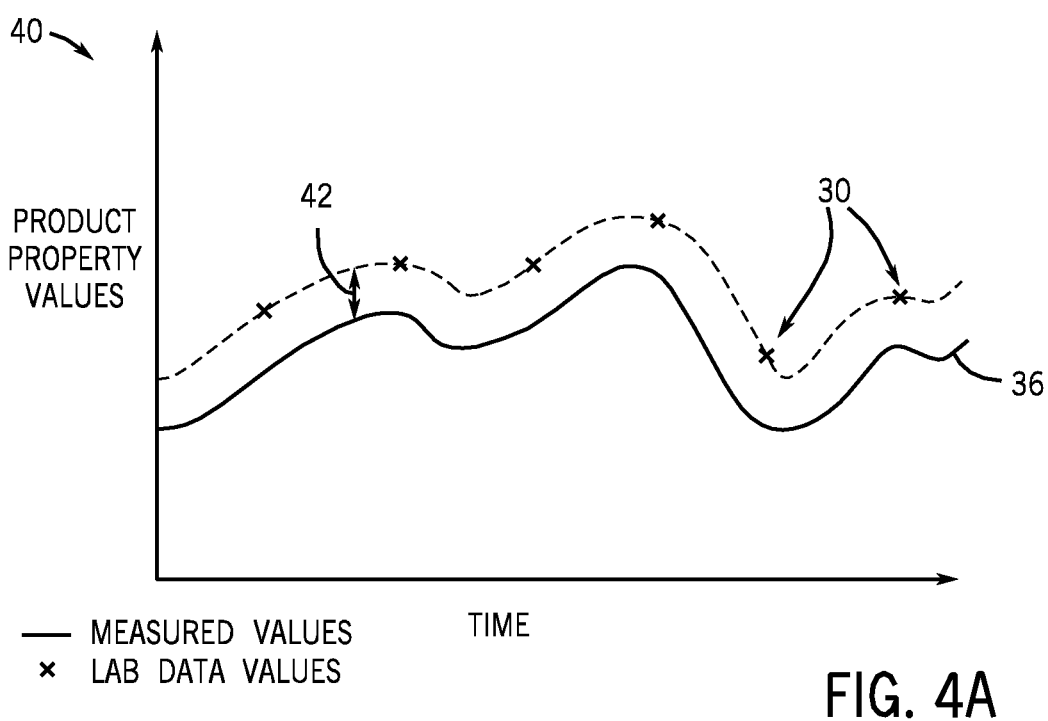
FIG. 4A is a chart of exemplary time series depicting a high level of correlation between laboratory data values and measured data values for a property of interest of the product of the process system of FIG. 1.
Figure 4B:
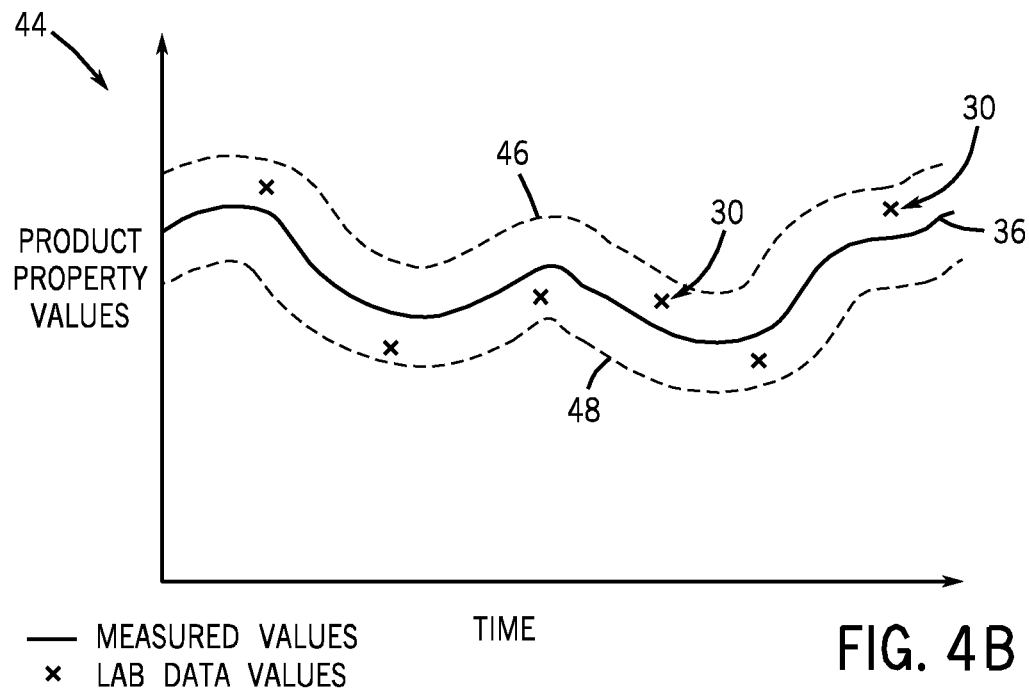
FIG. 4B is a chart of exemplary time series depicting an intermediate level of correlation between laboratory data values and measured data values for a property of interest of the product of the process system of FIG. 1.
Figure 4C:
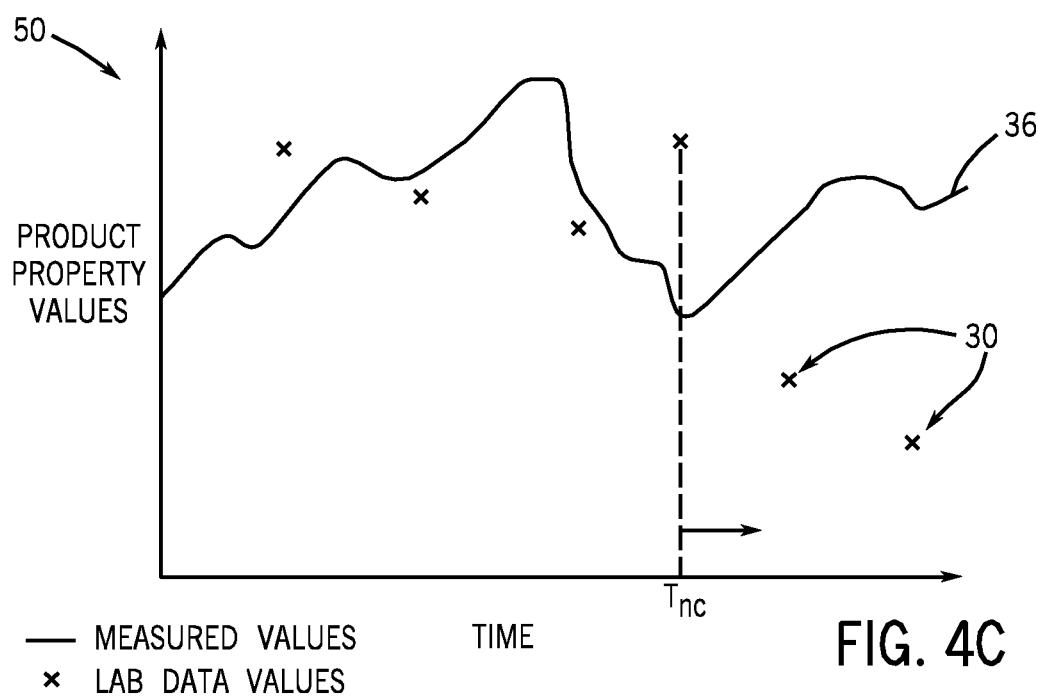
FIG. 4C is a chart of exemplary time series depicting a low level of correlation between laboratory data values and measured data values for a property of interest of the product of the process system of FIG. 1.

The laboratory data values 30 for a given property of interest may correlate more closely to measured data values 36 for the given property of interest than for other properties of the product 16. Moreover, the level of correlation between laboratory and measured data values 30, 36 may vary over time for a particular property of interest. In other words, the level of correlation may degrade over time due, for instance, to the degradation of signals from the sensor 22 of the process system 10 responsible for obtaining measure data values 36 for the property of interest, changes in the reliability or repeatability of the testing procedures, and so forth. FIGS. 4A through 4C depict several various correlation patterns for laboratory and measured data values 30, 36 for a given property of interest.

For example, FIG. 4A is a chart 40 of exemplary time series depicting a high level of correlation between laboratory data values 30 and measured data values 36 for a property of interest of the product 16 of the process system 10 of FIG. 1. As illustrated in FIG. 4A, the laboratory data values 30 correlate very well with the measured data values 36. In particular, in the illustrated time series, the laboratory data values 30 are generally slightly higher than the measured data values 36 by a substantially constant offset value 42.

However, in some instances, the laboratory data values 30 may not correlate with the measured data values 36 as well as depicted in FIG. 4A. For example, FIG. 4B is a chart 44 of exemplary time series depicting an intermediate level of correlation between laboratory data values 30 and measured data values 36 for a property of interest of the product 16 of the process system 10 of FIG. 1. As illustrated in FIG. 4B, while there does appear to be a certain degree of correlation between the laboratory data values 30 and the measured data values 36, there does not appear to be a substantially constant offset value 42, as in FIG. 4A. However, it does appear that all of the laboratory data values 30 occur within a fixed range around the measured data value time series 36. In particular, all of the laboratory data values 30 illustrated in FIG. 4B fall within an upper validation band 46 and a lower validation band 48 around the measured data value time series 36. The laboratory data validation module 32 may use the upper and lower validation bands 46, 48 to determine the occurrence of valid or invalid laboratory data values 30.

In yet other instances, there may be even less correlation between the laboratory and measured data values 30, 36 than depicted in FIG. 4B. For example, FIG. 4C is a chart 50 of exemplary time series depicting a low level of correlation between laboratory data values 30 and measured data values 36 for a property of interest of the product 16 of the process system 10 of FIG. 1. Specifically, FIG. 4C depicts a correlation between the laboratory data value time series 30 and the measured data value time series 36 which appears to degrade over time, as discussed above. In particular, the laboratory data values 30 appear to become more sporadic after time $T_{nc}$.

However, as discussed above, in many situations, measured data values 36 may not be available for the property of interest. For example, direct measurement of data values corresponding to the property of interest may not be easily obtained, such as when appropriate sensors 22 are not easily implemented within the process system 10. In these situations, the laboratory data validation module 32 may nevertheless be capable of validating the laboratory data values 30 generated by the laboratory testing facility 28.

Figure 5:
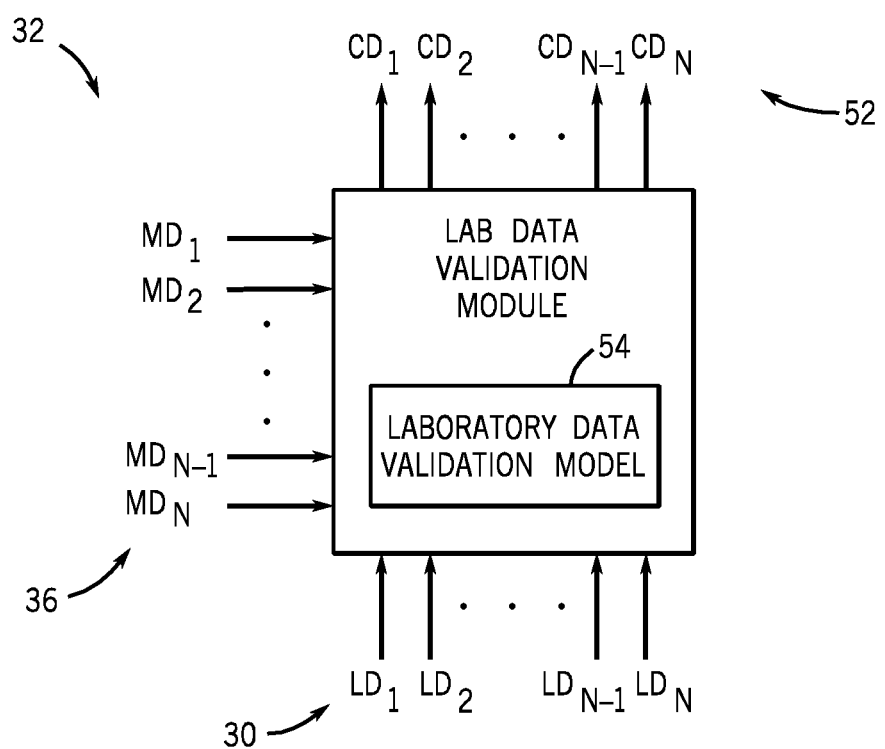
FIG. 5 is a diagram of an exemplary laboratory data validation module configured to implement the present laboratory data validation techniques for a property of interest.

FIG. 5 is a diagram of an exemplary laboratory data validation module 32 configured to implement the present laboratory data validation techniques for a property of interest. As shown, the laboratory data validation module 32 may receive laboratory data values 30, represented by the reference labels $LD_1, LD_2, \ldots, LD_{N-1}$, and $LD_N$, and measured data values 36, represented by the reference labels $MD_1, MD_2, \ldots, MD_{N-1}$, and $MD_N$ for a plurality of properties of interest. The laboratory data validation module 32 may process these laboratory and measured data values 30, 36 and generate a plurality of control data values 52, represented by the reference labels $CD_1, CD_2, \ldots, CD_{N-1}$, and $CD_N$, corresponding to the properties of interest. In general, the laboratory data validation module 32 may both validate the laboratory data values 30 as well as generate the control data values 52, which may be used by the control system 12 to generate appropriate control functions 20 for the process system 10, as shown in FIG. 2.

The laboratory data validation module 32 may include a laboratory data validation model 54, which may be used in conjunction with the laboratory data validation techniques described herein. In particular, the laboratory data validation model 54 may specify or represent relationships between attributes or variables related to the process system 10, the laboratory data values 30, the measured data values 36, and any other variables which may impact the present laboratory data validation techniques. Specifically, the laboratory data validation model 54 may take into account the correlations between the laboratory and measured data values 30, 36 described above in FIGS. 3 and 4.

The laboratory data validation model 54 may be of any of a variety of types. For example, the laboratory data validation model 54 may be linear or nonlinear, although for most complex processes, a nonlinear model may be preferred. Other model types contemplated include fundamental or analytical models (i.e., functional physics-based models), empirical models (such as neural networks or support vector machines), rule-based models, statistical models, standard model predictive control models (i.e., fitted models generated by functional fit of data), or hybrid models using any combination of the above models.

The laboratory data validation model 54 may include a set of mathematical relationships, including steady state relationships, and may also include a time lag relationship for each parameter change to be realized. A great variety of dynamic relationships may be possible and each relationship between variables may characterize or capture how one variable may affect another and also how fast the effects may occur or how soon an effect may be observed. The laboratory data validation model 54 may be created from a combination of relationships based on available data such as fundamental dynamic and gain relationships, available process system 10 data, and so forth. Models may also be customized to the process system 10 layout and design.

An important characteristic of the laboratory data validation model 54 may be to identify when a laboratory or measured data value 30, 36 changes as a result of a change in one or more manipulated variables. In other words, the laboratory data validation model 54 may identify the time-response (e.g., time lag) of one or more attributes of a process system 10 with respect to changes in manipulated variables. For example, once a controller adjusts an actuator 24 variable, there may be a certain time-dependent response before observing an effect at a sensor 22 of the process system 10. This time-dependent response may be unique for each independent actuator 24.

In certain embodiments, the laboratory data validation model 54 may include inferential models (also referred to as property approximators or virtual online analyzers (VOAs)). An inferential model may be a computer-based model which calculates inferred quality properties from one or more inputs of other measured properties.

Therefore, the laboratory data validation model 54 may be capable of modeling complex statistical and mathematical relationships between a plurality of variables relating to the operation of the process system 10. In particular, in the context of the present laboratory data validation techniques, the laboratory data validation model 54 may be capable of modeling complex statistical and mathematical relationships between the laboratory and measured data values 30, 36 in the broader context of the process system 10.

This functionality may prove particularly useful in situations where measured data values 36 are not readily available for a particular property of interest. In these situations, the laboratory data validation module 32 may validate the laboratory data values 30 for the particular property of interest based only on laboratory and measured data values 30, 36 for other properties of the product 16, aided by the laboratory data validation model 54. Many of the properties of the product 16 may be related and the laboratory data validation model 54 may be capable of capturing these relationships.

Therefore, for any particular property of interest of the product 16, the laboratory data validation model 54 may be capable of generating a predicted data value for a property of interest of the product 16 based on laboratory and measured data values 30, 36 for other properties of the product 16. Then, the laboratory data validation module 30 may compare the current laboratory data value 30 against the predictive value to determine whether the current laboratory data value 30 falls within an acceptable range around the predicted value.

FIG. 6 is a flow chart of an exemplary method 56 for validating laboratory data values 30 against predicted values for a property of interest of a product 16 of the process system 10 of FIG. 1. In step 58, laboratory data values 30 for the property of interest may be obtained. As discussed above, the laboratory data values 30 may be obtained by sending a sample 26 of the product 16 to the laboratory testing facility 28, performing laboratory testing procedures on the sample 26 to obtain the laboratory data values 30, and then sending the laboratory data values 30 to the laboratory data validation module 32 for validation. However, this process for obtaining the laboratory data values 30 for the property of interest is merely exemplary and not intended to be limiting. Any appropriate method for obtaining the laboratory data values 30 may also be implemented.

In step 60, laboratory data values 30 for other properties of the product 16 may be obtained. These laboratory data values 30 may be obtained using similar techniques as described above with respect to step 58. However, the laboratory data values 30 for other properties of the product 16 may be used by the laboratory data validation model 54 to predict a value for the property of interest. In addition, in step 62, measured data values 36 for other properties of the product 16 may be obtained. As discussed above, these measured data values 36 may be obtained via sensors 22 of the process system 10 capable of measuring the properties. Again, the measured data values 36 for other properties of the product 16 may be used by the laboratory data validation model 54 to predict a value for the property of interest.

In step 64, the predicted value for the property of interest may be determined by the laboratory data validation model 54 based on the laboratory and measured data values 30, 36 of the other properties of the product 16. Once the predicted value has been determined, in step 66, the current laboratory data value 30 may be validated against the predicted value for the property of interest. As discussed above, this may involve comparing the predicted value from the laboratory data validation model 54 and the actual laboratory data value 30 from the laboratory testing facility 28. In particular, the laboratory data validation module 32 may determine whether the current laboratory data value 30 falls within an acceptable range around the predicted value. If, in step 66, the laboratory data validation module 32 determines that the current laboratory data value 30 is valid, the method 56 may proceed to step 68. In step 68, the laboratory data validation module 32 may determine that the laboratory data value 30 should be used by the control system 12 for the property of interest.

If, in step 66, the laboratory data validation module 32 determines that the current laboratory data value 30 is not valid, the method 56 may proceed to step 70. In step 70, the laboratory data validation module 32 may provide feedback to the laboratory testing facility 28. For instance, if there has been a recent pattern of invalid laboratory data values 30, the laboratory data validation module 32 may suggest to the laboratory testing facility 28 that there may be a problem with the current testing procedures.

In step 72, the laboratory data validation module 32 may determine that a sample 26 of the product 16 should be retested in order to obtain a new laboratory data value 30. In step 74, the laboratory data validation module 32 may determine that either the predicted value or an estimated (e.g., average) value should be used by the control system 12 for the property of interest, depending on the particular circumstances. In addition, in step 74, the laboratory data validation module 32 may determine that no action should be taken from a control standpoint. In other words, no change to the control system 12 may be a viable alternative when the laboratory data value 30 is not validated.

The present data validation techniques may be used in various applications but may be particularly useful in the process of paper manufacturing. FIG. 7 is a diagram of an exemplary paper manufacturing plant 76 equipped with a control system 12 including a laboratory data validation module 32 configured to implement the present laboratory data validation techniques for a property of interest of the paper manufacturing process. The paper manufacturing plant 76 may be configured to produce a paper product and may include a broke system 78, a stock blending system 80, and a paper machine 102. The output of the broke system 78 and additional additive materials, including chemical and filler materials, are combined with the output of the stock blending system 80 to generate pulp slurry to be processed by the paper machine 102 for the formation of paper, as will be discussed below.

As shown in FIG. 7, the broke system 78 may include one or more broke tanks 82 which may store and feed the broke to one or more broke chests 84. Broke from the broke chests 84 may be refined by the broke refining unit 86. The refined broke output of the broke refining unit 86 may be provided to the mix chest 88. Here, additional additives 90, which may include fillers, chemical agents, and starch, may be added to provide certain properties in the paper product. Depending on the specific desired properties of the resulting paper product, a number of additives may be incorporated here or at other locations in the paper manufacturing plant 76. For example, sizing agents, such as alkylketene dimmer (AKD) or alkylsuccinic anhydrides (ASA) may be added to control the hydrophobicity of the paper product by controlling the amount of water the paper will absorb. For instance, certain paper products adapted for writing may require a relatively slow rate of absorption with regard to the water-based inks that may be used, whereas other paper products used in the cleaning industry may be typically engineered to absorb large amounts of water quickly. The filler components may include dyes, clay, talc, and calcium carbonates, for example, which may contribute to the opacity or color characteristics of the paper.

The stock blending system 80 may include various refining units for preparation of a number of refined stock furnishes. In the present embodiment, the stock blending system 80 may include a first furnish refining unit 92 for producing a first furnish stock, though any number of furnish refining units, represented here by the reference number 94, may be provided to produce the necessary stock furnish materials for producing the paper product. These refining units 92-94 may control the fiber development of the stock furnishes that are provided to the blend chest 96. The blend chest 96 output of the stock blending system 80 may then be provided to the mix chest 88 along with the refined broke from the broke system 78 and the additives 90. Once mixed, the contents 98 of the mix chest 88 may be provided to the machine chest 100 prior to being processed by the paper machine 102.

The paper machine 102 may include a dilution controlled head box (not shown) through which the contents of the machine chest 100 may be provided to a forming section 104, which may include a wire press, for example. The formed sheets may then be passed through one or more press sections 106 to remove additional water and moisture from the paper before continuing through a series of drying sections 108. The output of the drying sections 108 may then proceed through a surface treatment section 110, a finishing section 112, and one or more drive sections 114. The output of the paper machine 102 may be a finished paper product 116. The paper product 116 produced by the paper manufacturing plant 76 may commonly be stored in reels which may later be apportioned into smaller sizes for distribution to customers (e.g., reams).

The broke system 78, stock blending system 80, and paper machine 102 may be at least partially controlled by the control system 12. In the illustrated embodiment, the control system 12 may be adapted to control the paper manufacturing plant 76 by controlling a property of interest to achieve a particular quality target in the finished paper product 116. As discussed above, various properties of interest in the paper manufacturing process may not be directly measurable on-line and may typically only be obtained off-line in the laboratory testing facility 28. Thus, as discussed above, the control system 12 may include the laboratory data validation model 54, which may be configured to predict a value of the property of interest, to validate laboratory data values 30 corresponding to the property of interest, and to generate outputs from the control system 12 representing control actions or functions 20 which may manipulate various parameters of the paper manufacturing plant 76 in order to control the property of interest to meet a target set point, range, minimum limit, or maximum limit.

In the illustrated embodiment, the control system 12 may receive measured data values 36 from the broke system 78, the stock blending system 80, the paper machine 102, and so forth. For instance, these data values may be measured or derived by the sensors 22 (not shown) discussed above, which may be provided at various locations in the paper manufacturing plant 76. The measured data values 36 may then be utilized by the laboratory data validation model 54 to estimate or predict a value for the property of interest. Based on the predicted value, the laboratory data validation model 54 may validate laboratory data values 30 corresponding to the property of interest and the control system 12 may generate the control actions or functions 20 which may manipulate actuators 24 (not shown) of the broke system 78, the stock blending system 80, and the paper machine 102, respectively, in order to control the property of interest to meet a target set point.

The properties of interest of the paper products 116 produced by the paper manufacturing plant 76 may include any number of mechanical, structural, optical, or other types of properties. For example, the properties of interest may include weight, thickness, density, distribution of material, porosity, hardness, stiffness, bursting strength, surface strength, tensile strength, tearing resistance, compressibility, Scott bond, ply bond, surface texture, friction, curl, dimensional stability, brightness, color, gloss, opacity, moisture, absorption, and so forth.

While the above techniques have been described primarily with reference to the paper manufacturing plant 76 depicted in FIG. 7, it should be understood that the present invention is not intended to be limited in this regard. Indeed, the present techniques for validating laboratory data values 30 may be applicable to a number processes, such as chemical and plastics processing applications. Moreover, the present data validation techniques may be applicable for controlling various manufacturing processes based on various properties of interest not typically measurable on-line and thus, the examples provided herein are not intended to limit the applications of the present techniques in this regard. Further, the techniques described herein may be implemented in any suitable manner, including hardware-based circuitry or a computer program having executable code stored on one or more tangible computer-readable media. The techniques described herein may also be implemented using a combination of both hardware and software elements.

In particular, the control system 12 may include many various components, depending upon the system design, type of system controlled, system control needs, and so forth. For instance, the control system 12 may include interface circuitry configured to receive the process information 18 which, as discussed above, may include values or signals obtained using the sensors 22, as well as the laboratory data values 30 from the laboratory testing facility 28. The interface circuitry may further include filtering circuitry, analog-to-digital conversion circuitry, and so forth. The interface circuitry may be configured to communicate with processing circuitry, which may include any suitable processor, such as a microprocessor, a field programmable gate array, and so forth. The processing circuitry may carry out control functions 20 and, in the present embodiments, may perform model predictive control functions based upon knowledge of certain aspects of the process system 10. By way of example, the processing circuitry may execute one or more model predictive control algorithms to develop predicted values corresponding to the laboratory data values 30. Such algorithms may be defined by one or more control models stored in a memory circuit communicatively coupled to the processing circuitry. The memory circuit may also include control routines executed by the processing circuitry, as well as certain desired variables, variable settings, set points, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   obtaining a laboratory data value for a property of interest of a product using off-line testing in a laboratory environment;
   obtaining laboratory data values for other properties of the product using off-line testing in the laboratory environment;
   obtaining measured data values for the other properties of the product using on-line measurement during production of the product;
   determining, using a laboratory data validation model of a process controller, a predicted value for the property of interest based on the laboratory data values and the measured data values for the other properties of the product; and
   determining, using the laboratory data validation model of the process controller, validity of the laboratory data value for the property of interest with respect to the predicted value for the property of interest, wherein the validity of the laboratory data value for the property of interest relates to whether the laboratory data value for the property of interest is within an acceptable range around the predicted value for the property of interest.

2. The method of claim 1, comprising controlling a process in a first manner if the laboratory data value for the property of interest is determined to be valid, and controlling the process in a second manner if the laboratory data value for the property of interest is determined to be invalid.

3. The method of claim 2, wherein controlling the process in the first manner includes using the laboratory data value for the property of interest as a control variable by the process to control the property of interest.

4. The method of claim 2, wherein controlling the process in the second manner includes obtaining another laboratory data value for the property of interest.

5. The method of claim 2, wherein controlling the process in the second manner includes using the predicted value for the property of interest as a control variable by the process to control the property of interest.

6. The method of claim 2, wherein controlling the process in the second manner includes using an estimated value for the property of interest as a control variable by the process to control the property of interest.

7. The method of claim 1, wherein the laboratory data validation model is based on relationships between the laboratory data value for the property of interest and the laboratory data values for the other properties.

8. The method of claim 1, wherein the laboratory data validation model is based on relationships between the laboratory data value for the property of interest, the laboratory data values for the other properties, and the measured data values for the other properties.

9. The method of claim 1, wherein the laboratory data value for the property of interest of the product is obtained from a laboratory testing facility at which a sample of the product is tested.

10. The method of claim 1, wherein the laboratory data values for the other properties of the product are obtained from a laboratory testing facility at which a sample of the product is tested.

11. The method of claim 1, wherein the product comprises a paper product, and the property of interest comprises weight, thickness, density, distribution of material, porosity, hardness, stiffness, bursting strength, surface strength, tensile strength, tearing resistance, compressibility, Scott bond, ply bond, surface texture, friction, curl, dimensional stability, brightness, color, gloss, opacity, moisture, or absorption of the paper product.

12. A method, comprising:
    obtaining a laboratory data value for a property of interest of a product using off-line testing in a laboratory environment;
    obtaining laboratory data values for other properties of the product using off-line testing in the laboratory environment;
    obtaining measured data values for the other properties of the product using on-line measurement during production of the product; and
    determining, using a laboratory data validation model of a process controller, whether the laboratory data value for the property of interest is within an acceptable range around a predicted value for the property of interest based at least in part on the laboratory data values and the measured data values for the other properties, wherein the laboratory data validation model is based on relationships between the laboratory data value for the property of interest, the laboratory data values for the other properties, and the measured data values for the other properties.

13. The method of claim 12, comprising controlling a process in a first manner if the laboratory data value for the property of interest is determined to be within the acceptable range, and controlling the process in a second manner if the laboratory data value for the property of interest is determined to not be within the acceptable range.

14. The method of claim 12, wherein the laboratory data value for the property of interest of the product is obtained from a laboratory testing facility at which a sample of the product is tested.

15. The method of claim 12, wherein the laboratory data values for the other properties of the product are obtained from a laboratory testing facility at which a sample of the product is tested.

16. The method of claim 12, wherein the product comprises a paper product, and the property of interest comprises weight, thickness, density, distribution of material, porosity, hardness, stiffness, bursting strength, surface strength, tensile strength, tearing resistance, compressibility, Scott bond, ply bond, surface texture, friction, curl, dimensional stability, brightness, color, gloss, opacity, moisture, or absorption of the paper product.

17. A process controller for determining validity of laboratory data values, comprising:
 a processor;
 an input configured to receive laboratory data values corresponding to a property of interest of a product using off-line testing in a laboratory environment, laboratory data values corresponding to other properties of the product using off-line testing in the laboratory environment, and measured data values corresponding to other properties of the product using on-line measurement of a process during production of the product; and
 a memory device comprising instructions executable by the processor, the instructions including instructions for:
  determining predicted values for the laboratory data values corresponding to the property of interest based at least in part on the laboratory data values corresponding to the other properties and the measured data values corresponding to the other properties; and
  determining validity of the laboratory data values corresponding to the property of interest based on the laboratory data values corresponding to the other properties, the measured data values corresponding to the other properties, and the predicted values for the laboratory data values, wherein the validity of the laboratory data values relates to whether the laboratory data values are within an acceptable range around a predicted value.

18. The process controller of claim 17, wherein the input is configured to receive the measured data values corresponding to the other properties of the product from sensors of the process.

19. The process controller of claim 17, wherein the memory device includes instructions for controlling the property of interest via actuators of the process.

20. The process controller of claim 17, wherein the laboratory data values are received from a laboratory testing facility at which a sample of the product is tested.

* * * * *